March 17, 1970  G. V. JACOBY  3,501,682
CONSTANT TENSION-CONSTANT SPEED DRIVE BY
MEANS OF A TANDEM MOTOR CONNECTION
Filed June 26, 1967  2 Sheets-Sheet 1

INVENTOR
GEORGE V. JACOBY

BY Edward J Norton
ATTORNEY

INVENTOR
GEORGE V. JACOBY
BY Edward J. Norton
ATTORNEY

United States Patent Office 3,501,682
Patented Mar. 17, 1970

3,501,682
CONSTANT TENSION-CONSTANT SPEED
DRIVE BY MEANS OF A TANDEM MOTOR
CONNECTION
George V. Jacoby, Bala-Cynwyd, Pa., assignor to RCA
Corporation, a corporation of Delaware
Filed June 26, 1967, Ser. No. 648,610
Int. Cl. B65h 77/00
U.S. Cl. 318—7                                    8 Claims

ABSTRACT OF THE DISCLOSURE

There is disclosed a motor drive system for winding a sheet of material at constant speed and tension between a takeup and a supply reel. One electric motor capable of providing constant mechanical power is used to drive the takeup reel and thereby effect a transfer of the material from a supply reel to the takeup reel. A second electric motor which is energized by a load sensitive voltage developed in the first electric motor, is used to provide a corrective counter force on the supply reel.

Background of invention

The ability to maintain constant speed and tension in transferring and winding a sheet of material permits uniform packing of the material on the reel and a minimal load on capstans and guides. Where the material is a tape or record medium capable of storing information, constant speed and tension result in uniform tape penetration and a minimum of distortion and error in recording and recovery of the information.

Many drive systems exist in the prior art which attempt to control speed and tension. However, the prior art systems find it necessary to employ extensive servomechanisms, speed and tension sensing transducers, elaborate guides and other complicated equipment in conjunction with the basic drive mechanism. The disclosed invention provides constant speed and tension by a two motor system, where the elements perform both the driving and control functions thereby eliminating the need for the complicated peripheral equipment used in the prior art.

It is therefore an object of the present invention to provide an improved constant speed and tension drive system.

Another object is to provide a constant speed and tension transfer and reeling system which can be used for a multitude of materials such as recording tape, paper and fabric.

A further object is to provide a reeling system which is reversible in that constant speed and tension are maintained regardless of the direction of transfer of the sheet of material.

In one embodiment of the present invention, an electric motor possessing a characteristic such that the product of torque and speed is constant, is used to drive a rotatable takeup reel causing the sheet of material to be transferred from a rotatable supply reel and wound on the takeup reel. A second electric motor coupled to the supply reel is caused to operate in its "braking region," the braking region being the region where the motor's rotating member is driven in a direction opposite to the direction of torque produced by the second motor. The second motor is electrically excited from the counter electromotive forcing voltage developed across an energizing winding of the first motor. Since this counter electromotive forcing voltage is sensitive to variations in speed of the material being transferred, the second motor is able to apply a proportional corrective torque to the supply reel to overcome attempted variations in speed and tension.

Figure 1:
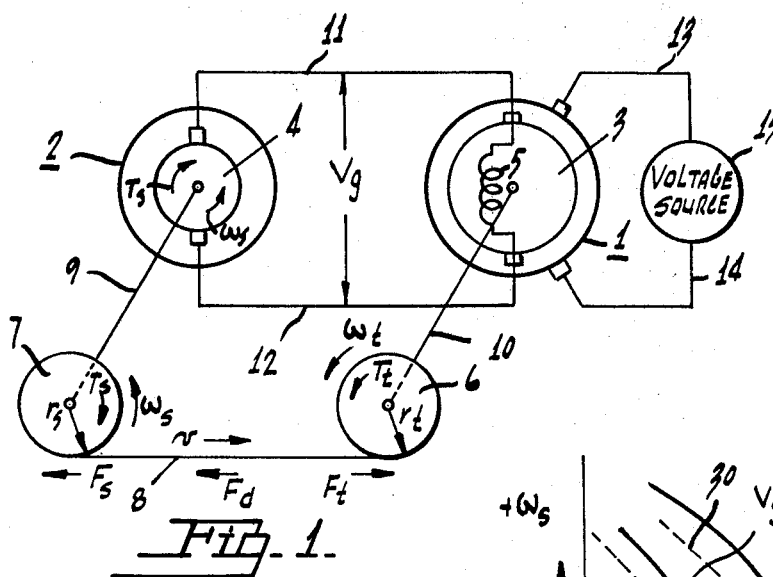
FIGURE 1 is a diagrammatic view helpful in illustrating the principles of its operation.

If reference is made to FIGURE 1, there is shown a rotatably mounted takeup reel 6 and a rotatably mounted supply reel 7. A sheet of material 8 is secured at one end to the takeup reel 6 and at its other end to the supply reel 7. There is shown a drive motor 1 having a rotating member 3 on which energizing winding 5 is wound. The takeup reel 6 is connected to rotating member 3 by means of a suitable coupling 10. A supply motor 2 is shown having a rotating member 4 to which the supply reel 7 is connected by means of a suitable coupling 9. A voltage source 15 is connected by wires or leads 13 and 14 to the drive motor 1. The supply motor 2 is energized by a voltage $V_g$ developed across energizing winding 5 and applied to the supply motor 2 by wires or leads 11 and 12.

The arrangement of FIGURE 1 operates in the following manner. Drive motor 1 is energized by voltage source 15 and because of its characteristics provides constant mechanical power to rotating member 3. This constant mechanical power is transmitted to the takeup reel 6 by the coupling 10. The rotation of the takeup reel 6 causes the sheet of material 8 to be transferred from the supply reel 7 to the takeup reel 6 thereby rotating supply reel 7. The rotation of supply reel 7 drives the rotating member 4 via coupling 9. At the same time, the supply motor 2 is energized by the counter electromotive forcing voltage $V_g$ which is developed across winding 5 of drive motor 1. This voltage $V_g$ causes the supply motor 2 to exert a torque on the rotating member 4 which is opposite to the direction that this member 4 is being driven by the supply reel 7. The amplitude of $V_g$ is proportional to the instantaneous speed of rotating member 3 and because the member 3 drives the takeup reel 6 and supply reel 7, any deviations in speed and therefore tension of the sheet of material 8 will be sensed by winding 5 associated with member 3. At the same time the amplitude changes of voltage $V_g$ will cause the amount of counter-torque generated by supply motor 2 to change thereby cancelling out the unbalance of the system and maintaining a constant speed and tension on the material 8.

For a clearer understanding of the invention, a brief discussion of the detailed theory of operation will now be given with the aid of FIGURES 1, 2, 3 and Table I below which defines the symbols used in FIGURE 1.

Table I $F_t$ = the driving force exerted on the sheet of material (pounds)
$F_s$ = the braking force exerted on the sheet of material (pounds)
$F_d$ = the drag force exerted on the sheet of material due to friction and other effects (pounds)
$T_t$ = the torque exerted on the takeup reel (ft.-pounds)
$T_s$ = the torque exerted on the supply reel (ft.-pounds)
$\omega_t$ = the angular velocity of the takeup reel (radians/sec.)
$\omega_s$ = the angular velocity of the supply reel (radians/sec.)
$v$ = the linear velocity of the continuous sheet of material (feet/sec.)
$r_t$ = radius of the takeup reel (feet)
$r_s$ = radius of the supply reel (feet)
$V_g$ = counter electromotive forcing voltage of the drive motor (volts).

In FIGURE 1, the takeup reel 6 is the driving reel because the direction of rotation of its angular velocity $\omega_t$ is in the same direction as the torque $T_t$ exerted on it by the drive motor 1. The supply reel 7 is the driven reel, because the direction of rotation of its angular velocity $\omega_s$ is opposite to the direction of the braking torque $T_s$ which is exerted on it by the supply motor 2.

FIGURE 1 shows the three forces $F_t$, $F_s$ and $F_d$ acting on the sheet of material 8 such that $$F_t = F_s + F_d$$

In the steady state condition of no acceleration, $F_d$ can be assumed to be constant and if $F_s$ can be made constant $$F_s + F_d = \text{constant}$$

therefore $$F_t = \text{constant}$$

which results in a constant driving force and hence a constant tension on the sheet of material 8. If at the same time the takeup reel 6 is driven at constant power then:

$$T_t \cdot \omega_t = \text{constant}$$

It can also be shown that:

$$v = \frac{T_t \omega_t}{F_t}$$

Therefore it follows that $v$ will be constant and the sheet of material 8 will then move at a constant linear velocity. Thus the two requirements that must be satisfied for constant speed and tension reeling are $$T_t \omega_t = \text{constant}$$

$$F_s = \text{constant}$$

Figure 2:
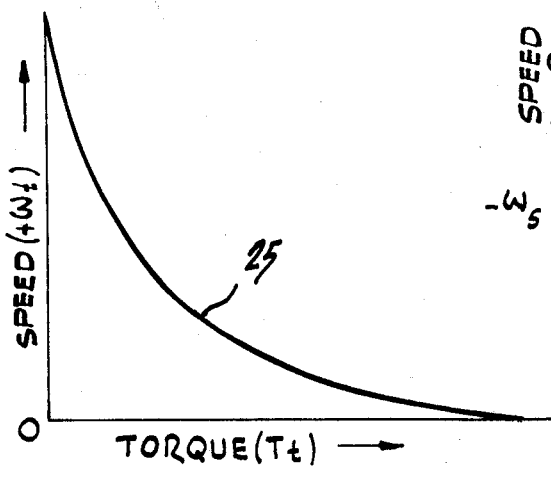
FIGURE 2 is a curve showing the performance characteristics of the drive motor.

FIGURE 2 shows the performance characteristic 25 of the drive motor 1. As can be seen from the figure, the torque $T_t$ decreases as its speed $\omega_t$ increases.

The mechanical power $P_m$ is defined as:

$$P_m = T_t \omega_t$$

The characteristic 25 indicates the drive motor 1 is one capable of supplying constant mechanical power. Referring to FIGURE 1, the drive motor 1, therefore provides a constant mechanical power $P_m$ to its rotating member 3 which is then transmitted to the takeup reel 6 by means of a coupling 10. The takeup reel 6 is thereby driven at constant mechanical power satisfying the above requirement that $T_t \omega_t$ = constant.

Figure 3:
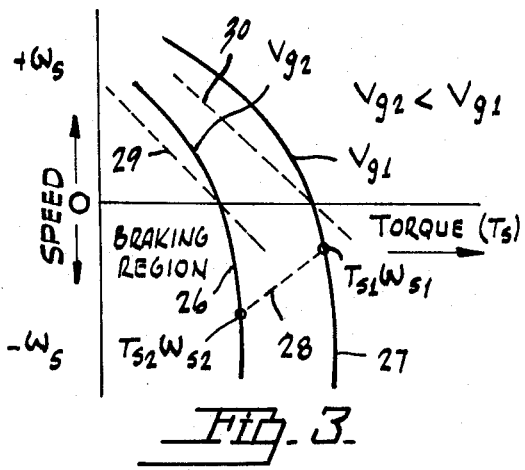
FIGURE 3 is a set of curves showing the performance characteristics of the supply motor.

If reference is now made to FIGURE 3, a family of curves defining the performance characteristics of supply motor 2 of FIGURE 1 are shown. Curves 26 and 27 represent the practical performance characteristic of a properly designed motor, while the dashed curves 29 and 30 represent the ideal characteristics. Since the velocity $\omega_s$ of rotating member 41 is opposite in direction to the torque $T_s$ exerted on rotating member 4, supply motor 2 will operate in the "braking region" of the curves. That is, the region of positive torque and negative speed where, for a given excitation voltage $V_g$, torque is practically independent of speed. If initially a voltage $V_{g1}$, as shown in FIGURE 3, is impressed upon supply motor 2 it will operate on curve 27 at a point $T_{s1}\omega_{s1}$. Then as drive motor 1 drives the takeup reel 6 from a condition where no material is wound on it toward the full conditions, its radius $r_t$ increases, its speed $\omega_t$ decreases and the counter electromotive forcing voltage $V_{g1}$ decreases in FIGURE 3 from $V_{g1}$ to $V_{g2}$. Correspondingly, the supply reel 7 which is coupled to supply motor 2 exhibits a speed which increases from $\omega_{s1}$ to $\omega_{s2}$ as its radius $r_s$ decreases due to the removal of the sheet of material 8. At the same time the torque exerted on supply reel 7 decreases from a high torque $T_{s1}$ to a lower torque $T_{s2}$. The supply motor 2 has therefore proceeded along the path 28 of FIGURE 3 and is now operating at the point $T_{s2}\omega_{s2}$ on curve 26. Since $$T_{s2}\omega_{s2} = T_{s1}\omega_{s1}$$

a constant braking force will be exerted on the supply reel 6 and therefore on the continuous sheet of material 8 causing $F_s$ to be constant. This operation fulfills the second requirement indicated above namely $$F_s = \text{constant}$$

Since both requirements are satisfied, the transfer of the sheet of material 8 will be at constant speed and tension. Operation at constant speed and tension is therefore dependent on drive motor 1 having the performance characteristic 25 of FIGURE 2 and supply motor 2 providing the peformance characterized by curves 26 and 27 of FIGURE 3.

Figure 4:
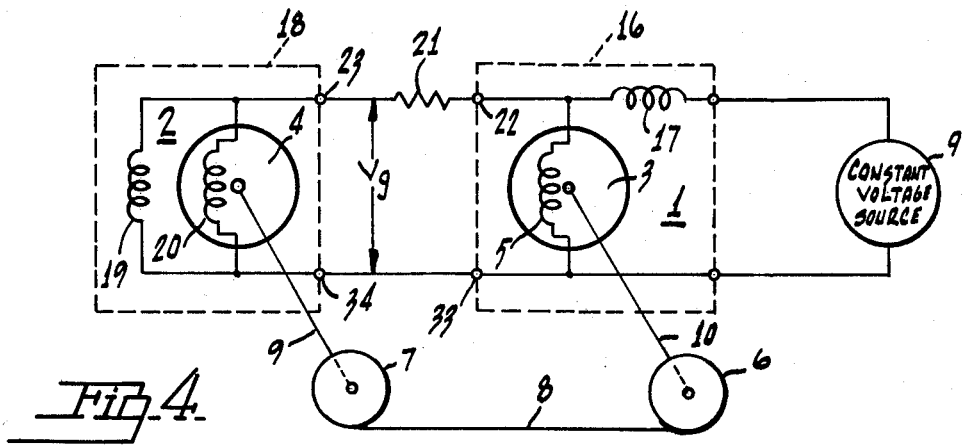
FIGURE 4 is a partial diagrammatic and partial schematic view of one embodiment of the invention.

If reference is made to FIGURE 4 in which elements similar to those shown in FIG. 1 are identified by similar reference numerals, there is shown an embodiment of the invention wherein the contents enclosed by the dashed line labelled 16 represent the drive motor 1 for the takeup reel 6. There is shown a field energizing winding 17 connected in series with the armature energizing winding 5 which is wound on rotating member 3. The drive motor 1 is in this case a direct current series type motor and when excited by the constant voltage source 9 will exhibit the essentially linear torque-speed characteristic 25 of FIGURE 2. The contents enclosed by the dashed line 18 represent the supply motor 2 for the supply reel 7, which has a field energizing winding 19 connected in parallel with the armature energizing winding 20. The armature energizing winding 20 is wound on rotating member 4. Supply motor 2 is in this case a direct current shunt type motor and as an ideal type direct current shunt motor would have the linear characteristics of dashed curves 29 and 30 of FIGURE 3. However, the ideal characteristics are not desirable for the supply motor 2, in this application, because torque increases with speed in the braking region (positive torque-negative speed). Rather, the characteristics to be used are shown by curves 26 and 27 of FIGURE 3 where, in the braking region, torque is substantially independent of speed. The amount of curvature of the torque-speed curve of a direct current shunt motor in the braking region, is determined by the amount of decrease in flux as armature current is increased. This decrease in flux is known in the art as "armature reaction," and exists in varying degrees in every direct current motor. Since armature reaction produces non-linearities, it is normally considered undesirable. However in the present invention, a motor with a high degree of armature reaction is purposely used for the supply motor. The armature reaction and attendant non-linearity is thereby utilized in combination with the permanent shunt connection to produce the desired torque-speed curves 26 and 27 of FIGURE 3.

In the embodiment shown in FIGURE 4, a resistor 21 is coupled between terminal 22 of drive motor 1 and terminal 23 of supply motor 2. Resistor 21 provides a proportionality constant which optimizes the excitation voltage $V_g$ applied to supply motor 2.

Figure 5:
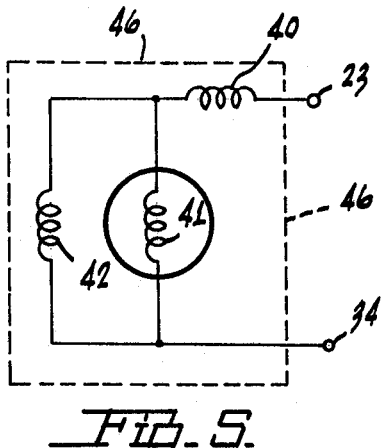
FIGURE 5 is a schematic diagram of a supply motor configuration which can be used according to the invention.

Other embodiments of supply motor 2 may be used to fulfill the requirements for a particular application of the invention. FIGURE 5 shows an alternative embodiment of the supply motor 2 of FIGURE 4. In FIGURE 5 the motor is a direct current type which is schematically represented by the energizing windings shown within the surrounding dashed line 46. This motor has one field winding 40 connected in series with the parallel connection of armature winding 41 and a second field winding 42. When the motor of FIGURE 5 is used for the supply motor 2 of FIGURE 4, it is coupled in the circuit by respectively connecting the motor terminals 23 and 34 shown in FIGURE 5 to the terminal points labelled 23 and 34 in FIGURE 4.

Figure 6:
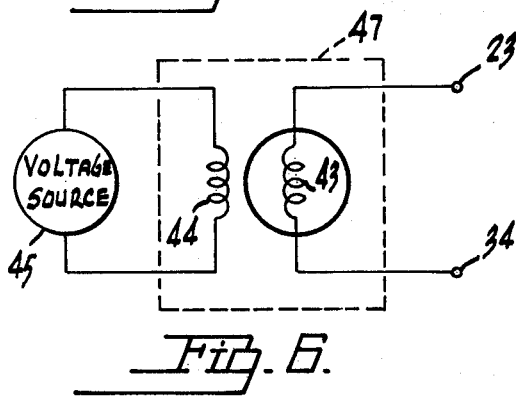
FIGURE 6 is a schematic diagram of a further embodiment of a supply motor.

FIGURE 6 shows a further alternative embodiment of the supply motor 2 of FIGURE 4. In FIGURE 6 the motor is a direct current type which is schematically represented by the energizing windings shown within the surrounding dashed lines 47. This motor has an armature winding 43 and a field winding 44. Winding 44 is separately excited by voltage source 45. When the motor of FIGURE 6 is used for the supply motor 2 of FIGURE 4, it is coupled to the circuit by respectively connecting the motor terminals 23 and 34 shown in FIGURE 6 to the terminal points labelled 23 and 34 in FIGURE 4. In addition, a second voltage source 45 is coupled to field winding 44 to excite it.

The embodiments of the supply motor shown in FIGURES 5 and 6 provide a more linear torque-speed characteristic in the braking region. This characteristic is desired, for example, in an application where the drag force $F_d$ is not constant in the steady state operation of the invention.

It may also be desirable to maintain constant speed and tension of the sheet of material 8 of FIGURE 4 between the supply reel 7 and the takeup reel 6 regardless of the direction of transfer. To provide this capability the drive motor and the supply motor must each be capable of being operated both as a low impedance series connected motor and a high impedance shunt connected motor.

Figure 7:
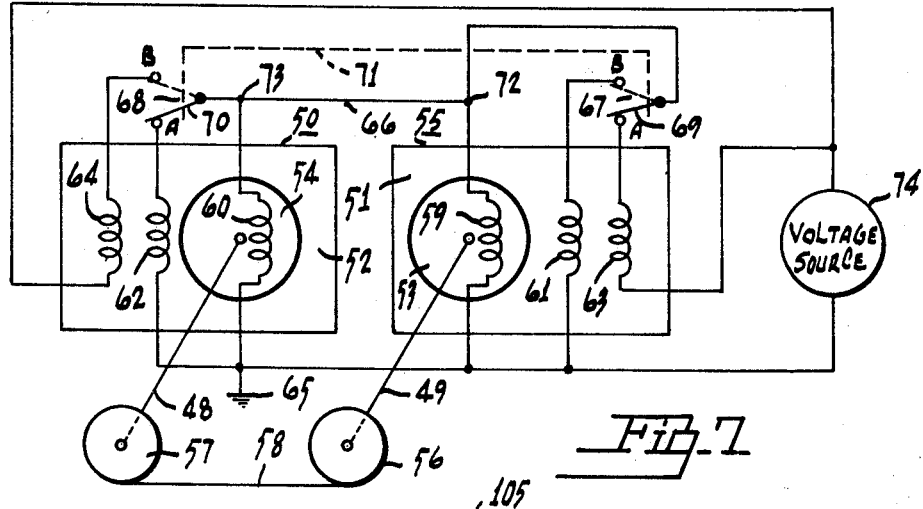
FIGURE 7 is a schematic diagram of another embodiment of the invention.

In FIGURE 7 there is shown an embodiment of the invention wherein a sheet of material 58 is secured at one end to a takeup reel 56 and at its other end to a supply reel 57. Takeup reel 56 is coupled by suitable mechanical means 49 to motor 51 which is represented by the contents of block 55. Supply reel 57 is coupled by suitable mechanical means 48 to motor 52 which is represented by the contents of block 50. Motor 51 comprises a low impedance field winding 63, a higher impedance field winding 61, a rotating member 53, and an armature winding 59 which is wound on rotating member 53. Motor 50 comprises a low impedance field winding 64, a higher impedance winding 62, a rotating member 54, and an armature winding 60 which is wound on rotating member 54. For proper operation of motors 50 and 51 the impedance ratio of the high impedance field winding to the low impedance field winding is typically at least 4:1. There is also shown a switch 67 having a wiper arm 69 and two contact positions labelled A and B respectively. A second switch 68 having a wiper 70 and two contact positions labelled A and B respectively is also provided. Switches 67 and 68 are simultaneously acutated by a suitable control device, not shown, whose action is denoted by broken line 71.

When switches 67 and 68 are in their first position wipers 69 and 70, denoted by solid lines, are in contact position A. This completes a circuit from a ground terminal or point of reference potential 65 to terminal 72 through winding 59 of motor 51 which is connected in parallel with the series connection of voltage source 74, winding 63 and wiper 69. Terminal 72 is coupled through wire 66 to terminal 73, then from terminal 73 to ground terminal 65 through winding 60 of motor 52 which is connected in parallel with the serial connection of wiper 70 and winding 62.

When switches 67 and 68 are in their second position, wipers 69 and 70, denoted by dashed lines, contact position B. This completes a circuit from ground terminal 65 to terminal 73 through winding 60 which is connected in parallel with the serial connection of voltage source 74, winding 64 and wiper 68. Terminal 73 is still coupled through wire 66 to terminal 72 and has its ground return through winding 59 which is connected in parallel with the serial connection of wiper 69 and winding 61.

In FIGURE 7, when switches 67 and 68 are in their first position, motor 51 is the series connected drive motor and will exhibit the performance characteristic 25 of FIGURE 2, while motor 50 is the shunt connected supply motor and will exhibit the performance characterized by curves 26 and 27 of FIGURE 3. When switches 67 and 68 are in their second position, motor 51 is now the shunt connected supply motor which exhibits the performance characterized by curves 26 and 27 of FIGURE 3, while motor 50 is now the series connected drive motor and will exhibit the performance characteristic 25 of FIGURE 2. Thus a transfer of the sheet of material 58 in either direction is accomplished at constant speed and tension.

Figure 8:
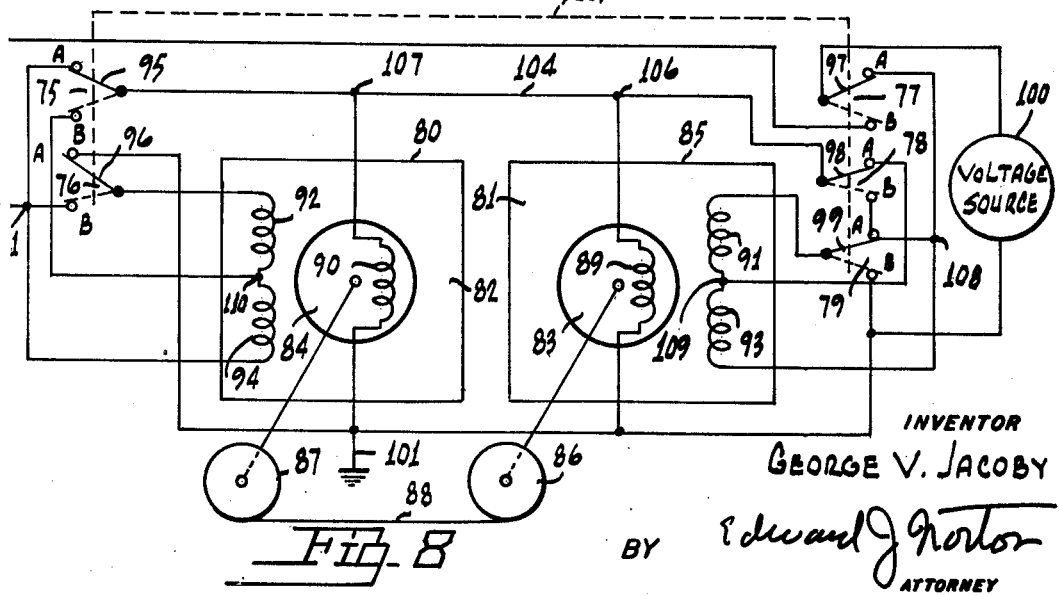
FIGURE 8 is a schematic diagram of a further embodiment according to the invention.

FIGURE 8 is a further embodiment of the invention which is also capable of effecting a transfer of a sheet of material 88 in either direction at constant speed and tension. The sheet of material 88 is secured at one end to takeup reel 86 and at its other end to a supply reel 87. Takeup reel 86 is rotatably couple to motor 81 which is represented by the contents of block 85. Supply reel 87 is rotatably coupled to motor 82 represented by the contents of block 80. Motor 81 comprises two field windings 91 and 93, a rotating member 83 and an armature winding 89 which is wound on rotating member 83. Motor 82 comprises two field windings 92 and 94, a rotating member 84 and an armature winding 90 which is wound on rotating member 84. There are also shown five switches 75 through 79 having the wipers 95 through 99 respectively. Switches 75 through 79 each have two contact positions labelled A and B respectively. Switches 75 through 79 are simultaneously actuated by a suitable control device, not shown, whose action is denoted by broken line 105.

When switches 75 through 79 are in their first position, their respective wipers 95 through 99 denoted by solid lines are in contact position A. This completes a circuit from ground terminal 101 through voltage source 100 and wiper 97 to terminal 108; from terminal 108 through the connection of winding 93 in parallel with the series connection of wiper 99 and winding 91 to terminal 109; from terminal 109 through wiper 98 to terminal 106; from terminal 106 through winding 89 to ground terminal 101 and from terminal 106 through wire 104 to terminal 107; from terminal 107 through winding 90 to ground terminal 101 and from terminal 107 through wiper 95 to terminal 111; and from terminal 111 through the serial connection of winding 94, winding 92 and wiper 96 to ground terminal 101.

When switches 75 through 79 are in their second position, wipers 95 through 99 denoted by dashed lines are in contact position B. This completes a circuit from ground terminal 101 through voltage source 100 and wiper 97 to terminal 111; from terminal 111 through the parallel connection of winding 94 with the serial connection of wiper 96 and winding 92 to terminal 110; from terminal 110 through wiper 95 to terminal 107; from terminal 107 through winding 90 to ground terminal 101 and from terminal 107 through wire 104 to terminal 106; from terminal 106 through winding 89 to ground terminal 101 and from terminal 106 through wiper 98 to terminal 108;

and from terminal 108 through the serial connection of winding 93, winding 91 and wiper 99 to ground terminal 101.

In FIGURE 8, when switches 75 through 79 are in their first or A position, voltage source 100 is applied to the parallel connection of windings 91 and 93 which provides a low impedance field winding connected in series with the armature winding 89 causing motor 81 to exhibit the drive motor characteristic 25 of FIGURE 2. At the same time windings 92 and 94 are connected in series to provide a high impedance field winding connected in parallel with the armature winding 90 causing motor 82 to exhibit the supply motor performance characterized by curves 26 and 27 of FIGURE 3. When switches 75 through 79 are in their second or B position, motor 82 now becomes a low impedance series connected motor and is the drive motor and motor 81 becomes a high impedance shunt connected motor and is the supply motor.

While specific embodiments have been shown and discussed, for example the use of direct current motors, it should be noted that the scope of the invention contemplates the use of any type motor which exhibits the indicated performance characteristics necessary for constant speed and tension operation. It is therefore intended that the claims cover these and other possible modifications which come within the spirit and scope of the invention.

What is claimed is:

1. Apparatus for driving a load at a constant speed, comprising:
   (a) a first electric motor having a rotating member and at least one energizing winding, such that applying a voltage to said energizing winding causes said first electric motor to furnish constant mechanical power to said rotating member, said rotating member being capable of developing an electromotive potential proportional to mechanical loading on it;
   (b) a second electric motor having a rotating member and at least one energizing winding, said second electric motor being capable of exerting a directive torque on its rotating member according to a potential applied to its energizing winding;
   (c) first means, including the load, for coupling said first motor's rotating member in a manner to drive said second motor's rotating member in a direction opposite to that of said directive torque; and
   (d) second means for applying said electromotive potential of said first electric motor, to an energizing winding of said second electric motor, said directive torque produced by said second motor being controlled solely in accordance with the load sensitive potential of said first electric motor.

2. The apparatus as recited in claim 1, wherein:
   (a) the first electric motor is a direct current type having a field energizing winding which is connected in series with the armature energizing winding of its rotating member; and
   (b) the second electric motor is a direct current type having a field energizing winding which is connected in parallel with the armature energizing winding of its rotating member.

3. Apparatus for maintaining constant speed and tension of a sheet of material transferred between reels, comprising:
   (a) at least one supply reel rotatably mounted;
   (b) at least one takeup reel rotatably mounted;
   (c) first means for securing the sheet of material at one end to said takeup reel and at its other end to said supply reel;
   (d) a first electric motor having a stationary member with at least a first energizing winding, said motor further having a rotating member with a second energizing winding such that applying a voltage to said energizing windings causes said first electric motor to furnish constant mechanical power to said rotating member, said rotating member being capable of developing a counter electromotive force proportional to mechanical loading exerted on it;
   (e) second means for coupling said takeup reel to said rotating member of said first electric motor to rotate said takeup reel to cause said sheet of material to be transferred from said supply reel to said takeup reel while causing a rotation of said supply reel;
   (f) a second electric motor having a stationary member with at least one energizing winding, said motor further having a rotating member with a second energizing winding said second electric motor being capable of producing a torque according to a voltage applied thereto, said torque being in a direction opposite to the direction that said rotating member is being externally driven;
   (g) third means for imparting the rotational motion of said supply reel to said rotating member of said second electric motor; and
   (h) fourth means for coupling said first and second energizing windings of said second electric motor to said second energizing winding of said first electric motor, to cause said second electric motor to produce a torque solely according to the counter electromotive force developed by said first electric motor's rotating member, said torque exerting a corrective counter force on said supply reel and therefore said sheet of material in a direction to eliminate deviations in speed and tension of said sheet of material being transferred.

4. Apparatus for maintaining constant speed and tension of a sheet of material transferred between reels, comprising:
   (a) a supply reel rotatably mounted;
   (b) a takeup reel rotatably mounted;
   (c) first means for securing the sheet of material at one end to said takeup reel and at its other end to said supply reel;
   (d) a first electric motor having a series connection of a first energizing winding and a second energizing winding where said second winding is wound on a rotating member;
   (e) a constant voltage source;
   (f) second means for coupling said takeup reel to said rotating member of said first electric motor;
   (g) a second electric motor having a first energizing winding in parallel with a second energizing winding where said second winding is wound on a rotating member;
   (h) third means for coupling said supply reel to said rotating member of said second electric motor;
   (i) fourth means for coupling the energizing windings of said first electric motor to said constant voltage source; and
   (j) further means, including a resistance, for coupling the energizing windings of said first electric motor to the energizing windings of said second electric motor.

5. Apparatus for maintaining constant speed and tension of a sheet of material transferred between reels, comprising:
   (a) a supply reel rotatably mounted;
   (b) a takeup reel rotatably mounted;
   (c) means for securing the sheet of material at one end to said takeup reel and at its other end to said supply reel;
   (d) a first electric motor having a first energizing winding, a rotating member and a second energizing winding wound on said rotating member, said first winding being connected in a series relationship with said second winding;
   (e) a constant voltage source;
   (f) means for coupling said takeup reel to said rotating member of said first electric motor;
   (g) a second electric motor having a first energizing winding, a second energizing winding, a rotating member and a third energizing winding which is wound on said rotating member, said first winding being connected in a series relationship with the parallel connection of said second and said third windings;
(h) means for coupling said supply reel to said rotating member of said second electric motor;
(i) means for coupling the energizing windings of said first electric motor to said constant voltage source; and
(j) means, including a resistance, for coupling the energizing windings of said first electric motor to the energizing windings of said second electric motor.

6. Apparatus for maintaining constant speed and tension of a sheet of matrial transferred between reels, comprising:
(a) a supply reel rotatably mounted;
(b) a takeup reel rotatably mounted;
(c) means for securing the sheet of material at one end to said takeup reel and at its other end to said supply reel;
(d) a first electric motor having a first energizing winding a rotating member and a second energizing winding which is wound on said rotating member, said first winding being connected in a series relationship with said second winding;
(e) a first constant voltage source;
(f) a second constant voltage source;
(g) means for coupling said takeup reel to said rotating member of said first electric motor;
(h) a second electric motor having a first energizing winding, a rotating member and a second energizing winding which is wound on said rotating member;
(i) means for coupling said supply reel to said rotating member of said second electric motor;
(j) means for connecting said second constant voltage source across said first energizing winding of said second electric motor;
(k) means for coupling the energizing windings of said first electric motor to said first constant voltage source; and
(l) means, including a resistance, for coupling the energizing windings of said first electric motor to the energizing windings of said second electric motor.

7. Apparatus for maintaining constant speed and tension of a sheet of material transferred between reels, where the direction of said transfer is reversible, comprising:
(a) first and second electric motors each having a rotating member and a plurality of energizing windings, each of said electric motors being capable of operating in a first selectable mode, in which constant mechanical power is furnished to said rotating member, said rotating member developing a counter electromotive force proportional to the mechanical load exerted on it, each of said electric motors being further capable of operating in a second and different selectable mode, in which a torque is furnished to said rotating member in a direction opposite to the direction that said rotating member is being externally driven, said torque being proportional to a voltage applied to said energizing windings;
(b) a supply reel rotatably mounted;
(c) a takeup reel rotatably mounted;
(d) means for securing the sheet of material at one end to said takeup reel and at its other end to said supply reel;
(e) means for coupling said takeup reel to said rotating member of said first electric motor;
(f) means for coupling said supply reel to said rotating member of said second electric motor;
(g) a voltage source; and
(h) switching means coupled to said first and second electric motors for selecting a desired independent operating mode for said first and second motors, whereby said first motor is operated in its first selectable mode and said second motor is operated in its second selectable mode.

8. Apparatus for maintaining constant speed and tension of a sheet of material transferred between reels, where the direction of said transfer is reversible, comprising:
(a) first and second direct current type electric motors each having a first and second field winding where the impedance of said second winding is at least four times greater than the impedance of said first winding and a rotating member on which is wound an armature winding, each of said electric motors being capable of operating in a first selectable mode, in which constant mechanical power is furnished to said rotating member, each of said electric motors being further capable of operating in a second and different selectable mode, in which a torque is applied to said rotating member in a direction opposite to the direction that said rotating member is being externally driven, said torque being proportional to a voltage applied to said windings;
(b) a supply reel rotatably mounted;
(c) a takeup reel rotatably mounted;
(d) means for securing the sheet of material at one end to said takeup reel and at its other end to said supply reel;
(e) means for coupling said takeup reel to said rotating member of said first electric motor;
(f) means for coupling said supply reel to said rotating member of said second electric motor;
(g) a constant voltage source;
(h) switching means, having a first position and a second position, where in said first position, the first electric motor has the first end of its armature winding connected to one end of its first field winding, the other end of its first field winding is connected to one side of said constant voltage source, the other side of said constant voltage source is connected to the second end of its armature winding, and in said second electric motor one end of its second field winding is connected to the first end of its armature winding, the other end of its second field winding is connected to the second end of its armature winding, causing said first electric motor to operate in its first selectable mode and said second electric motor to operate in its second selectable mode, and when said switching means is in said second position said second electric motor has the first end of its armature winding connected to one end of its first field winding, the other end of its first field winding is connected to one side of said constant voltage source, the other side of said constant voltage source is connected to the second end of its armature winding, and in said first electric motor one end of its second field winding is connected to the first end of its armature winding, the other end of its second field winding is connected to the second end of its armature winding, causing said first electric motor to operate in its second selectable mode and said second electric motor to operate in its first selectable mode;
(i) means for coupling the first end of said armature winding of said first electric motor to the first end of said armature winding of said second electric motor and the second end of said armature winding of said first electric motor to the second end of said armature winding of said electric motor; and
(j) means for actuating said switching means for selecting the desired mode of operation of said first and second electric motors, thereby determining the direction of transfer of the sheet of material.

(References on following page)

References Cited

UNITED STATES PATENTS

| | | | |
|---|---|---|---|
| 1,926,995 | 9/1933 | Harkness | 318—303 |
| 2,383,360 | 8/1945 | Artzt | 318—303 |
| 2,578,988 | 12/1951 | West | 318—50 |
| 2,751,532 | 6/1956 | Bretoniere | 318—7 |
| 2,751,533 | 6/1956 | Bretoniere | 318—7 |
| 2,837,705 | 6/1958 | Spuhler | 318—7 |
| 3,079,538 | 2/1963 | Yamashita | 318—7 |
| 3,210,629 | 10/1965 | Hornbarger | 318—49 |

ORIS L. RADER, Primary Examiner

ALFRED C. COLLINS, Assistant Examiner

U.S. Cl. X.R.

318—43, 49